E. M. HEYLMAN.
ENGINE GANG PLOW.
APPLICATION FILED OCT. 21, 1915.
1,234,760.
Patented July 31, 1917.
3 SHEETS—SHEET 2.
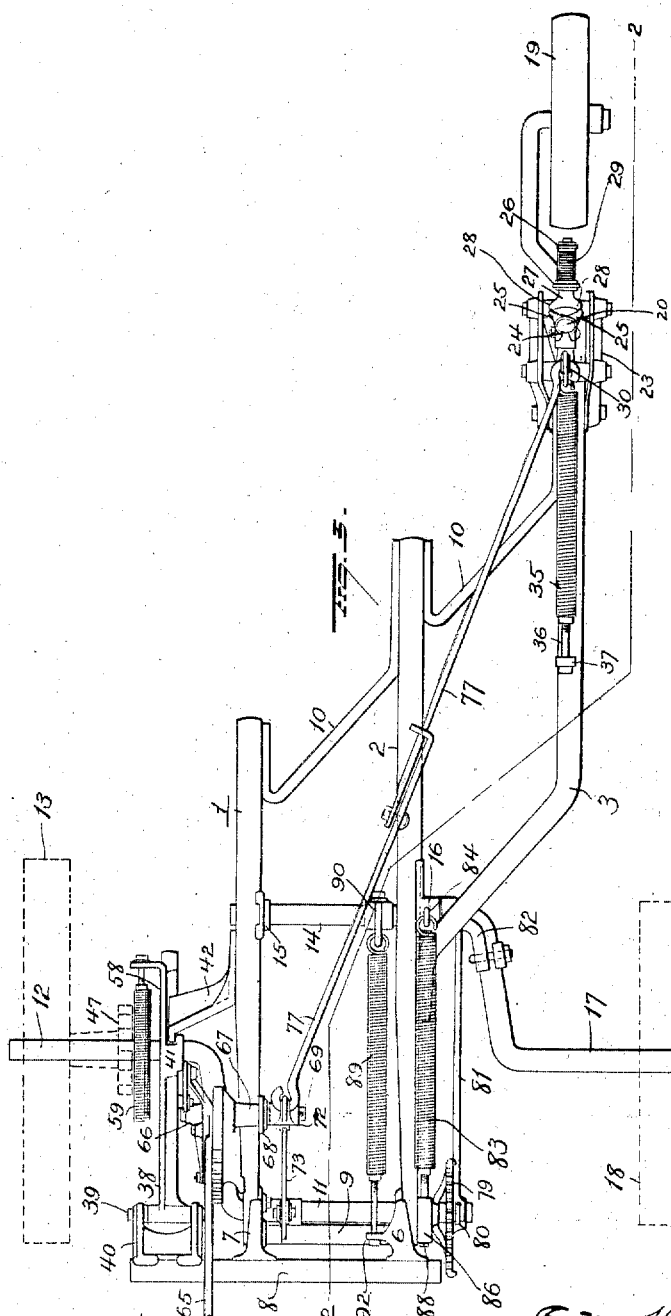
WITNESSES
E. Nottingham
G. F. Downing
INVENTOR
E. M. Heylman
By H. A. Seymour
Attorney

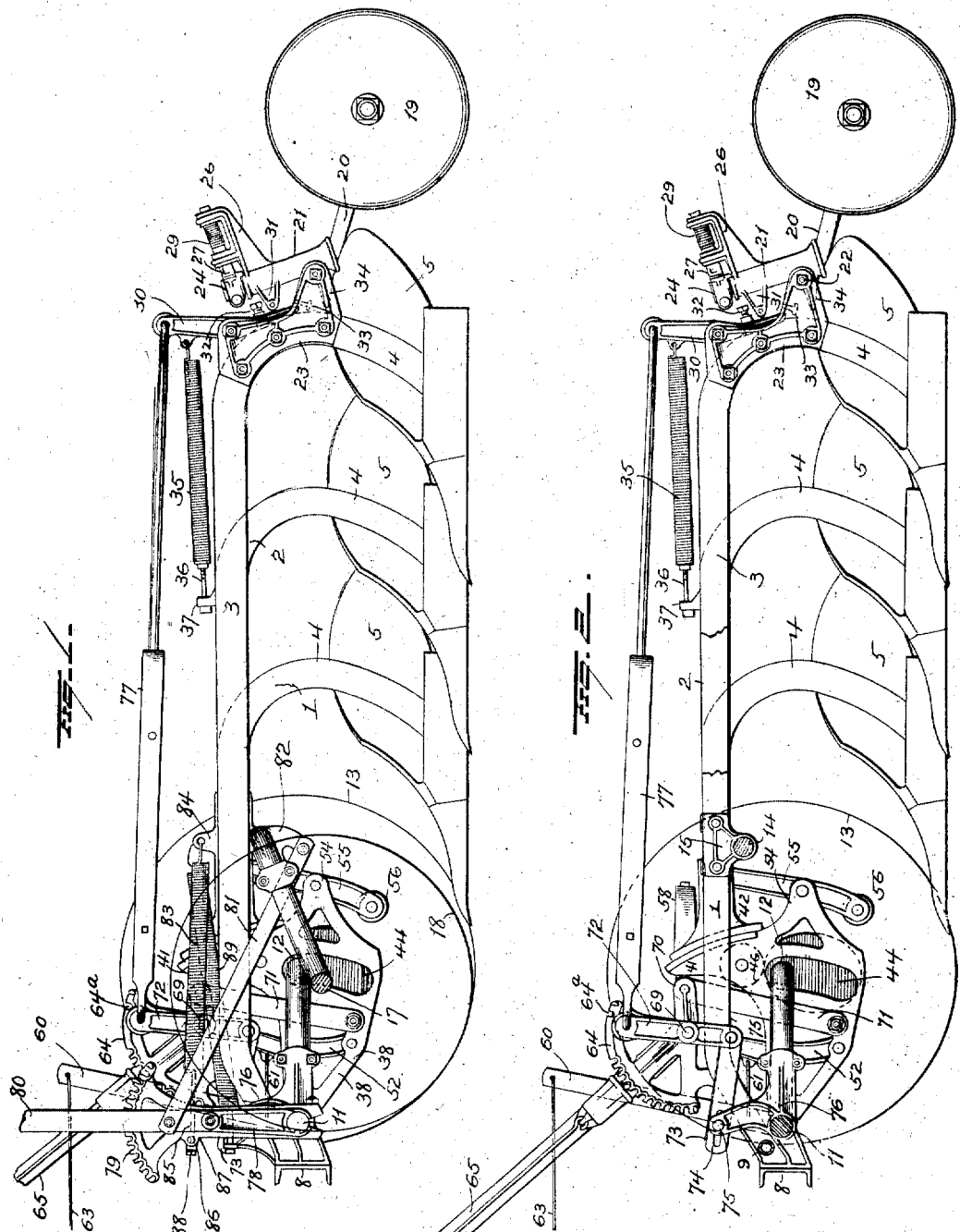

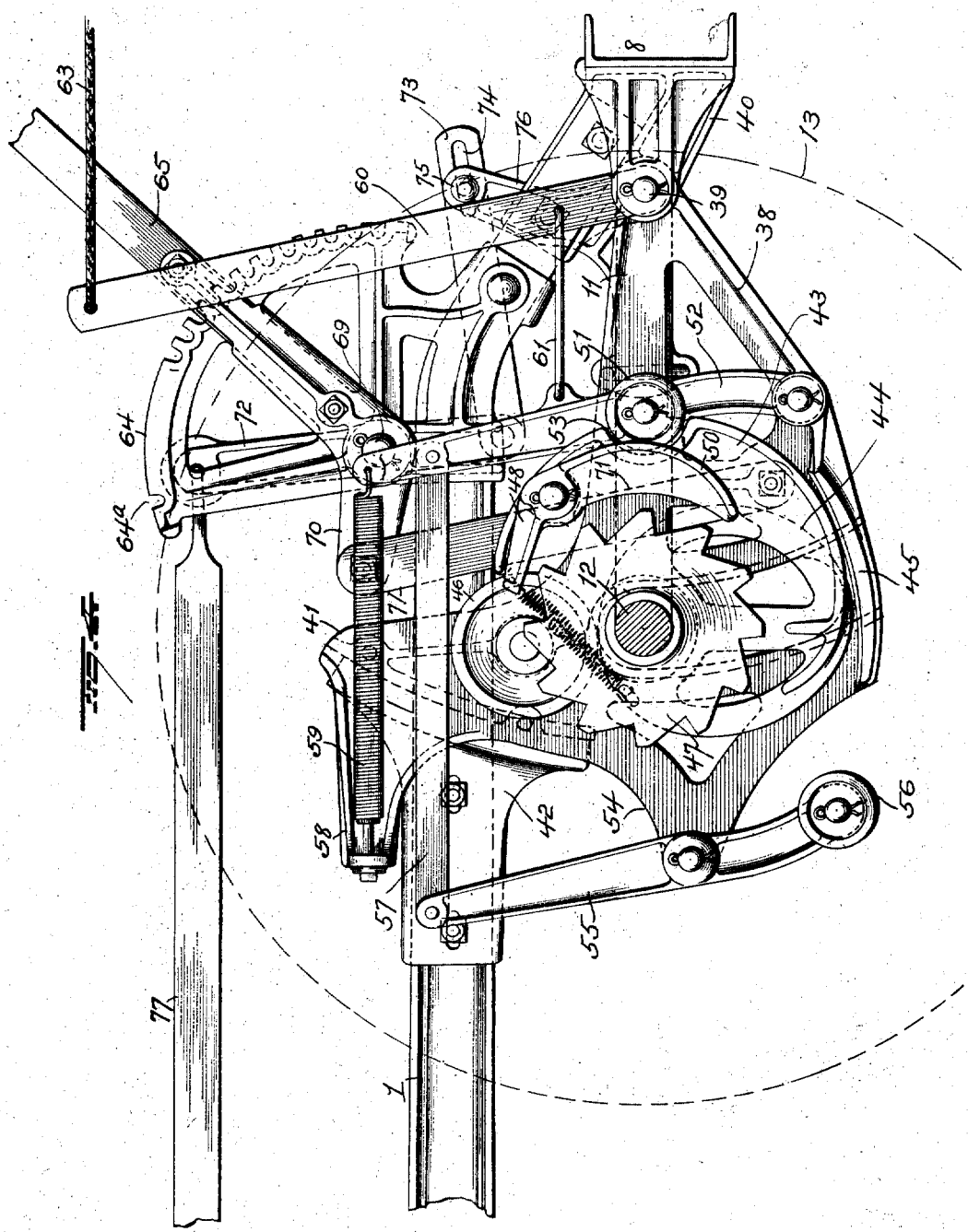

UNITED STATES PATENT OFFICE.

EDWARD M. HEYLMAN, OF SOUTH BEND, INDIANA, ASSIGNOR TO OLIVER CHILLED PLOW WORKS, OF SOUTH BEND, INDIANA.

ENGINE GANG-PLOW.

1,234,760.  Specification of Letters Patent.  Patented July 31, 1917.

Application filed October 21, 1915.  Serial No. 57,114.

*To all whom it may concern:*

Be it known that I, EDWARD M. HEYLMAN, a citizen of the United States, and a resident of South Bend, in the county of St. Joseph and State of Indiana, have invented certain new and useful Improvements in Engine Gang-Plows; and I do hereby declare the following to be a full, clear, and exact description of the invention, such as will enable others skilled in the art to which it appertains to make and use the same.

This invention relates to improvements in plows and more particularly to such as are drawn by means of a tractor and known in the art as engine gang plows,—one object of the invention being to so construct an engine gang plow embodying power lift and manual adjusting means that the same may be readily controlled and manipulated by the operator from his seat on the tractor.

A further object is to construct the lifting mechanism in such manner that it will operate to first raise the forward ends of the plows; then their rear ends and finally raise the plow bases bodily out of the ground in such manner that when fully raised the plows will be approximately the same distance above the ground, from end to end.

A further object is to construct the mechanism in such manner that when the plows are lowered, the forward ends of the plow bases will be lowered in advance of their rear ends and thus cause said bases to quickly enter the ground.

A further object is to provide means which will operate to balance the plow in such manner as to enhance the ease with which the plows may be raised, and at the same time reduce to a minimum, wear due to friction.

With these and other objects in view, the invention consists in certain novel features of construction and combinations of parts as hereinafter set forth and pointed out in the claims.

In the accompanying drawings, Figure 1 is a side elevation, partly in section, of a plow structure embodying my improvements; Fig. 2 is a sectional view on the line 2—2 of Fig. 3; Fig. 3 is a partial plan view; Fig. 4 is an enlarged elevation illustrating the power lift mechanism and portions of the manually operable adjusting devices.

1, 2, 3 represent the beams of the several plows of the gang and said beams are provided with depending standards 4 to which plow bottoms or bases 5 are secured. The plows are arranged in staggered formation as usual with gang plows and the forward ends of the beams 1 and 2 are connected through the medium of coupling devices 6—7 with a draft beam 8, while the forward end of the beam 3 may be bent laterally and secured to the beam 2. The coupling devices 6—7 are connected by a transverse brace 9, and the rear portions of the beams are connected and properly spaced apart by means of braces 10. The beam brackets or couplings 6—7 afford bearings for a furrow wheel crank axle 11, the cranked portion of which extends downward and rearwardly at one end and provided with a laterally projecting spindle portion 12 mounted in the hub of a furrow wheel 13.

A rear crank axle 14 is mounted in suitable bearing brackets 15—16: the crank arm of this axle projecting downwardly and forwardly from one end thereof and provided with a lateral spindle portion 17 mounted in the hub of the landside wheel 18.

The rear end of the gang of plows is supported by a caster or follower wheel 19. The upright portion of the axle 20 for this wheel is mounted in and projects upwardly beyond a bearing sleeve 21 pivotally supported at 22 between the rearwardly projecting lower portions of two plate brackets 23,—the latter being bolted at respective sides of the standard portion of the rearmost plow beam 3. A head 24 is secured to the upper end of the upright axle 20 and provided with radial projections 25. A bracket arm 26 projects rearwardly from the upper end of the bearing sleeve and affords a mounting for a plunger 27 having radial projections 28 at its forward end bearing against the radial projections 25 at the upper end of the axle 20,—rearward movement of said plunger being resisted by means of a spring 29. This construction provides a yieldable holding or locking means for the caster or follower wheel axle and serves to insure the retention of said wheel in proper alinement with the plow gang during the normal operation of the same, but at the same time permitting the wheel to caster when the plow is turned or to yield when subjected to abnormal lateral resistance.

A lever 30 is pivoted intermediate of its ends between the upper ends of the plate brackets 23 and the lower arm of this lever is disposed between the standard portion of the beam 3 and an arm 31 projecting forwardly from the upper portion of the bearing sleeve 21 so as to be in position to engage said arm. When the lever 30 is operated (by means hereinafter described) so as to move its upper end forwardly, its lower arm, (engaging the arm 31) will turn the bearing sleeve 21 on its pivotal support and thus cause the same to approach a vertical position and tends to press the follower wheel downwardly to raise the rear portion of the plow structure.

For the purpose of adjusting the normal working position of the follower wheel and thus adjust the working depth of the rear ends of the plow bases, I provide a set screw 32 passing through the lower arm of the lever 30 and engaging the standard portion of the beam 3. In order to limit the rearward movement of the bearing sleeve 21 and the consequent downward movement of the follower wheel 19 during the raising of the rear end of the plow structure, a stop 33 is provided on one of the bracket plates 23 in position to be engaged by an arm 34 projecting rearwardly from the pivoted lower end of the bearing sleeve.

A spring 35 is connected at one end to the upper arm of the lever 30 and at the other end, said spring is connected, by means of an adjustable rod 36, with a bracket 37 secured to the beam 3,—the purpose of which spring will be hereinafter explained.

A vertically disposed frame 38 is pivotally mounted at its forward end on a shaft 39 supported by a bracket 40 secured to the draft channel 8 at the furrow side of the plow structure and near the beam 1. The frame 38 is made with an upwardly-projecting portion 41 having sliding engagement with a guide bracket 42 secured to the beam 1,—the engaging faces of said frame and bracket being curved concentrically to the pivotal support of the frame 38 and at an angle to a vertical line passing through frame, bracket and beam so that when said frame is raised without pivoting (as hereinafter described), engagement of the frame with the bracket will cause the beams to rise.

A plate 43 is mounted on the spindle portion 12′ of the furrow-wheel axle 11 and carries a cam 44 which lies parallel with the pivoted frame 38 and is disposed over a flange 45 at the lower edge of said frame. A roller 46 is mounted on the pivoted frame 38 over the cam 44, so that the cam is disposed between said roller and the flange 45 of the pivoted frame. The hub of the furrow wheel 13 carries a ratchet wheel 47 and a pawl 48 mounted on the cam plate 43 is adapted to be moved into engagement with said ratchet wheel by the action of a spring 49. The pawl 48 is made with a depending tail portion 50 to be engaged by a roller 51 on a lever 52 for the purpose of normally retaining the pawl out of engagement with the ratchet wheel. The lever 52 is pivotally attached at its lower end to the pivoted frame 38 and the edge of the cam plate 43 is notched as at 53 to permit the roller 51 to engage the tail of the pawl, as clearly shown in Fig. 4. The pivoted an 38 is made with a rearwardly projecting arm 54 to which a lever 55 is pivotally attached between its ends. The lower end of this lever carries a roller 56 to engage the tail of the pawl 48 when the cam plate and cam shall have been turned sufficiently to raise the plows and thus disengage said plate and cam from the ratchet wheel of the power lift mechanism. The levers 52 and 55 are connected by means of a rod or bar 57 and the pivoted frame is provided at its upper end with a forwardly projecting arm 58, to which one end of a spring 59 is anchored,— the other end of said spring being attached to the lever 52 and serving to normally force the levers 52 and 55 in directions to cause their rollers to engage the tail of the pawl 48, when said pawl is in one or the other of the two positions which it may assume; as when the plows are at work, or when they shall have been raised. A lever 60 is mounted at its lower end on the short shaft 39 with which the pivoted frame is connected, and projects a considerable distance above the same. This lever is connected, by means of a rod 61, with the lever 52 and to the upper end of said lever 60, a cord 63 is attached. This cord extends to the operator's seat on a tractor (not shown) so that by pulling said cord, motion will be imparted to the lever 60 and thence by the rod 61 to the connected levers 52—55 for the purpose of so operating the latter as to move one or the other of the rollers 51—56 away from the tail of the pawl, to permit the latter to engage the ratchet wheel.

When the parts shall be thus operated, the cam plate and cam will become locked to the furrow wheel by means of the pawl 48 and ratchet 47 and the plows will be raised, as hereinafter more specifically explained.

A segment frame 64 is secured to the forward portion of the beam 1 and provided with a plurality of notches to receive a suitable detent carried by a hand lever 65. The segment frame is made with laterally projecting hubs 66—67 (Fig. 3) and the latter is connected with the beam 1 by means of a suitable bracket 68. A shaft 69 passes through the hubs 66—67, and on one end portion of this shaft, the lever 65 is mounted. The lever 65 is provided with an arm 70 which projects rearwardly and laterally from the pivotal mounting of the lever and to the free end of this lever arm, the upper end of a rod 71 is pivotally attached,—the lower end of said rod being connected with the lower portion of the pivoted frame 38.

The inner end of the shaft 69 projects beyond its bearing in the hub 67 and upon this projecting end of the shaft 69, a lever 72 is mounted between its ends. To the shorter lower arm of the lever 72, one end of a link 73 is pivotally connected. This link projects forwardly from its connection with the lever 72 and is provided near its forward end with an elongated slot 74 for the reception of a pin 75 at the upper end of an arm or bracket 76 rigidly secured to the furrow wheel crank axle 11.

A rod or pitman 77 (preferably comprising two members secured together) is connected at one end with the upper arm of the lever 72 and at the other end to the upper arm of the lever 30 of the follower wheel adjusting mechanism.

The arm 78 of a notched segment 79 is rigidly secured at its lower end to the furrow-wheel crank-axle 11 and to said segment arm, one end of a hand lever 80 is pivotally attached,—said hand lever being provided with a suitable detent to engage the notched segment. A rod 81 (Fig. 1) is connected at its forward end to the hand lever 80 a comparatively short distance above the pivotal support of the latter and at its rear end, this rod is pivotally attached to a bracket-arm 82 secured to the crank axle 14 and depending below the horizontal portion thereof.

A spring 83 for counterbalancing the furrow wheel axle, is attached at one end to a lug 84 and the other end of this spring is connected with the segment 79 or its arm 78 by means of a rod 85 passing through a sleeve 86 pivoted to the segment arm at 87 and having a nut or head 88 at its free end.

A counterbalancing spring 89 for the land wheel axle 14 is attached at one end to an arm 90 on said axle and the other end of this spring is connected, by means of an adjustable rod 91 with a lug 92 on the beam bracket or coupling 6.

Assuming that it is desired to raise the plows by the operation of the power lift mechanism, the operator seated on the tractor will pull the cord 63 and cause motion to be imparted, through the lever 60 and link 61 to the trip lever 52 and through the rod 57 to the trip lever 55. The result of this operation will be to move the roller 51 away from the tail of the pawl 49 and permit said pawl to be drawn (by the action of the spring 59) into mesh with the ratchet wheel 47. This wheel being secured to the hub of the furrow wheel, said wheel will become locked to the cam plate 43 and cam 44. As the plow moves forwardly, motion will be imparted, by the rotation of the furrow wheel, to the cam plate and cam and the latter, coöperating with the roller 46, will tend to raise the pivoted frame 38. As the pivoted frame is locked against independent vertical movement by reason of its connection with the hand lever 65 which is locked to the segment 64, it follows that the raising power imparted to the pivoted frame by the operation of the cam must be imparted by said frame to the guide bracket 42 on the beam 1, thus causing the connected beams to be raised.

It will be remembered that the segment arm 78 is rigidly secured to the furrow wheel axle 11, so that when said axle is raised and caused to turn as above explained, said segment arm and parts carried thereby will move rearwardly. When the power lift mechanism is operated the lever will be locked to the segment 79 at the upper end of the segment arm and therefore during the rearward movement of the segment arm and parts carried thereby, motion will be transmitted, through the rod 81, to the bracket arm 82 on the rear axle 14 and cause the axle to be turned, thus raising the landside side of the gang. During the raising of the forward ends of the beams, the plow bases will be tilted upwardly (the follower wheel constituting a fulcrum for the connected plows) and hence the points of the plow bases will be directed in an upward direction and the exit of said bases from the ground will be facilitated. The operations above described will occur during the first portion of the raising movement imparted by the cam. As the front ends of the plows are raised, the furrow wheel axle mounted at the forward ends of the beams will rise also, the spindle portion 12 of said axle 11 turning in the hub of the furrow wheel. During the first portion of the upward movement of the axle 11 and while the plow bases are being directed out of the ground, the pin on the arm 76 secured to said axle will move freely through the elongated slot 74 in the link 73. During the continued upward movement of the axle 11, and the plows and after the pin 75 has reached the end of the slot 74 in link 73, motion will be imparted by said link to the lever 72, causing the latter to pull the rod or pitman 77. The pulling of the rod or pitman will cause the lever 30 to be turned on its pivotal support to apply downward pressure on the follower wheel for raising the rear ends of the connected plows. Thus it will be seen that the plow bases will first be tilted upwardly and afterward raised bodily from the ground, so that when the plows shall have been fully raised, their bases will each be the same distance from end to end above the ground.

When the plows shall have been raised as above explained, the roller 56 on the trip lever 55 will engage the tail of the pawl 48 and release the latter from the ratchet wheel 47, thus permitting the machine to move forwardly with the plows locked in raised position.

By counterbalancing the axles with springs and by having the crank of the land wheel axle set forwardly (as shown in Fig. 1) the raising of the plows by means of the power lift mechanism will be greatly facilitated and slipping of the furrow wheel will be avoided. By having the crank of the land wheel axle set forwardly, the travel of the plow has a tendency to force the wheel backwardly when the crank of the axle approaches a vertical position. This not only assists in the raising of the plow, but relieves the load from the power lift mechanism at the time the same is at its full height and when the driving pawl must be released from the ratchet wheel. Thus my improved construction enables the pawl to be easily forced out of engagement with the ratchet wheel, and in consequence of this, the pawl and ratchet wheel are not subjected to great wear on account of frictional resistance to their relative movements.

When it is desired to lower the gang, the operator will pull the cord to operate the trip lever 55 and thus permit the pawl 48 to engage the ratchet wheel 47. The forward movement of the plow will now cause rotation of the cam plate and cam to permit the descent of the forward ends of the beams. It will be observed that the forward ends of plow bases will be lowered in advance of the lowering of the rear ends and hence the entrance of the plow bases into the ground will be greatly facilitated. This movement is largely due to the operation of the balance spring 35 having sufficient strength to hold the rear end of the gang up when the front ends of the plow bases are resting on the ground, and as the plows are drawn forward, the weight of the furrow will draw the plow bases down to correct working position. When the plow bases are in working position, the arm 31 on the bearing sleeve 21 will rest against the lower arm of the lever 30 and the adjusting screw 32, engaging the standard 4 of the beam 3, will limit the downward movement of the plow bases and the follower wheel 19 will carry the rear end of the gang so that the landsides of the plow bases will clear the bottoms of the furrows from three-eighths to one-half inch.

It will be observed that when the gang is in working position, the bearing sleeve for the follower wheel axle will incline forwardly. Such position of the bearing sleeve and axle has a tendency to cause the follower wheel to run more steadily than if said bearing sleeve and axle were vertically disposed, and with the assistance of the spring lock, the wheel has no tendency to run sidewise,— at the same time permitting the plow structure to be backed a short distance so that a plow base can be raised clear of an obstruction. It will be observed that when the plow is raised, the bearing sleeve 21 and axle 20 will be vertically disposed, which is the correct position for said sleeve and axle when the follower wheel is to caster during the turning of the plow structure.

With the hand lever mechanism hereinbefore described, the plows may be adjusted for depth of plowing and for leveling the plows, but as this mechanism constitutes the subject of a separate application for patent filed concurrently herewith, a detail description of the operation of this adjusting mechanism is superfluous herein, except to call attention to the fact that if a plow base should strike an obstruction which might be so located as to preclude the operation of the power lift mechanism, the gang could be raised (after backing the plow from the obstruction) by moving the lever 65 rearwardly until its detent shall engage the notch 64ª at the rear end of the segment 64.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is:—

1. In a gang plow, the combination with a plow gang, furrow and landside wheels, crank axles mounted on the plow gang and in the hubs of said wheels, a follower wheel and a mounting for the axle of the latter connected with the rear end of the plow gang, of an arm secured to and movable with the furrow-wheel axle, a lever pivoted between its ends on the plow gang, a link pivoted to the lower arm of said lever and having an elongated slot near its other end, a pin projecting from the arm on the furrow wheel axle and movable in said slot, actuating means for the follower wheel mounting, and a connection between said actuating means and the upper arm of said pivoted lever.

2. In a gang plow, the combination with a plow gang, furrow and land side wheels, and crank axles mounted on the plow gang and in the hubs of said wheels, of a pivoted frame having its pivotal mounting near the forward end of the plow gang and having a rearward projecting arm, a bracket secured to the plow gang, said frame and bracket having curved engaging faces disposed at an angle to the beams of the plow gang, means for locking said frame against pivotal movement relatively to the bracket, a cam plate mounted on the furrow wheel axle, a cam carried by said cam plate, a roller on the pivoted frame coöperative with said cam; a ratchet wheel on the hub of the furrow wheel, a pawl on the cam plate to engage said ratchet wheel, trip levers for said pawl pivoted to the pivoted frame, a link connecting said levers, a spring attached at one end to one of said trip levers and at the other end to the rearwardly projecting arm on the pivoted frame for moving said trip levers in one direction, and manually operated means for moving said trip levers in the other direction.

In testimony whereof, I have signed this specification in the presence of two subscribing witnesses.

EDWARD M. HEYLMAN.

Witnesses:
   Chas. A. Webster,
   Kate E. Buckley.